US006435756B1

(12) United States Patent
Robin et al.

(10) Patent No.: US 6,435,756 B1
(45) Date of Patent: Aug. 20, 2002

(54) PUSH-PULL CONNECTOR ASSEMBLY AND CONNECTOR FOR THIS ASSEMBLY

(75) Inventors: Thierry Robin, Chevry Cossigny; Yves Gazelot, Brie Compte Robert; Pierre Marchal, Champigny sur Marne, all of (FR)

(73) Assignee: Framatone Connectors International, Courbevoie (FR)

(*) Notice: Subject to any disclaimer, the term of this patent is extended or adjusted under 35 U.S.C. 154(b) by 0 days.

(21) Appl. No.: 09/516,714

(22) Filed: Mar. 1, 2000

(30) Foreign Application Priority Data

Mar. 4, 1999 (FR) ........................................... 99 02716

(51) Int. Cl.$^{7}$ .......................... H02G 15/00; H02G 3/22; H01R 13/627

(52) U.S. Cl. ......................... 403/221; 403/50; 403/220; 439/271; 439/556; 277/607; 277/634

(58) Field of Search ................................ 439/271, 272, 439/277, 278, 281, 282, 586, 587, 588, 589; 403/220, 221, 50, 51; 277/608, 634, 607

(56) References Cited

U.S. PATENT DOCUMENTS

| | | | | |
|---|---|---|---|---|
| 3,793,610 A | * | 2/1974 | Brishka | 439/349 |
| 4,588,247 A | | 5/1986 | Grappe et al. | 339/94 M |
| 4,666,166 A | * | 5/1987 | Hart et al. | 403/50 X |
| 4,940,420 A | * | 7/1990 | Munie | 439/272 |
| 5,222,909 A | * | 6/1993 | Nomura et al. | 439/271 X |

FOREIGN PATENT DOCUMENTS

| | | | | |
|---|---|---|---|---|
| EP | 0135299 A2 | | 3/1985 | |
| EP | 0491626 A1 | | 6/1992 | |
| GB | 2265765 A | * | 10/1993 | 439/587 |
| WO | WO 97/36348 | | 10/1997 | |

* cited by examiner

*Primary Examiner*—Lynne H. Browne
*Assistant Examiner*—Ernesto Garcia
(74) *Attorney, Agent, or Firm*—Perman & Green, LLP

(57) ABSTRACT

In order to provide watertight properties between a spring socket (1) and a release socket (2) for a plug of a push-pull connector, a bellows expansion joint (5) is provided between the spring and release sockets. When the two sockets are spaced apart, the bellows expansion joint is in the rest (non-stressed) position. When the release socket is driven closer to the spring socket, a stress is exerted on the bellows expansion joint (6, 7). This helps to force back the release socket. By this structure, improvements are shown in the vibration resistance and, at the same time, in the watertightness of the plug of a push-pull connector.

5 Claims, 2 Drawing Sheets

PUSH-PULL CONNECTOR ASSEMBLY AND CONNECTOR FOR THIS ASSEMBLY

BACKGROUND OF THE INVENTION

The present invention relates to a push-pull connector assembly whose basic features are at least spray tightness, a little immersion of said assembly being preferably admitted. The connector assembly comprises a connector and an outlet The invention also relates to the connector alone. The object of the invention is to use existing push-pull connectors, and to modify them as little as possible in order to be able to use previously developed industrial tools.

DESCRIPTIONS OF PRIOR DEVELOPMENTS

A push-pull connector is a connector whose connection to an outlet is obtained by pushing the connector therein. Once it is connected, the connector is automatically locked to the outlet. Particularly, by pulling the cable attached thereto, the connector cannot be normally hooked off. In order to uncouple the connector from the outlet, what has to be seized is not the cable but a release socket forming the outer envelope of the connector and being placed near said outlet. By pulling back the release socket, the mechanical connection is released and the connector and the outlet can be uncoupled. Such push-pull connectors are equally useful for electric, optical, and pneumatic connections. Their structure is such that they comprise a first socket, named spring socket, covered by the release socket, which is more directly in contact with the outlet. The first socket is a spring socket because, in the rest position, it has the effect of forcing back the release socket so that it is spaced therefrom. The two sockets slightly slide one onto the other to allow such movements.

The basic problem encountered with these push-pull connectors relates to the mechanism for coupling and ID uncoupling them to the outlet. They are not watertight, and not even spraytight. So, they do not comply with the IP55 standard and even less with the IP67 standard, which requires watertightness in conditions of temporary immersion in water fifteen centimeters deep. In fact, water or dust may infiltrate between sliding parts. By placing a joint where sliding occurs between the spring socket and the release socket, any relative movement of the two parts is naturally impeded. Hence, this joint may ensure watertightness, but the friction caused thereby prevents the release socket from getting back to its rest position under the action of the spring of the spring socket, when the thrust which pushes it towards the spring socket is released. Otherwise, friction is weak, and the relative movements are not prevented, but in this case no watertightness is provided.

SUMMARY OF THE INVENTION

In the invention, this drawback has been obviated by choosing a different joint shape. The joint of the invention is not a sliding joint. On the contrary, the joint of the invention is an elastic joint being able to take two positions. This elastic joint has edges in permanent contact with each of the sockets. This elastic joint substantially has the shape of a bellows. In a first condition, corresponding to the rest position, when the release socket is at a distance from the spring socket, the bellows is stretched, and the joint is extended. When the release socket is driven closer to i the spring socket, a stress is exerted on the elastic joint, and the bellows is folded. The elastic joint is nevertheless in permanent contact with the spring socket and with the release socket. Hence, it provides a watertight connection between these two parts. Further, when the joint is folded, it naturally tends to return to its unfolded shape. So, in these conditions it exerts a thrust tending to force back the release socket, away from the spring socket. In this manner, the joint assists the locking effort, instead of limiting the relative displacements of the two parts, as provided in prior art. The result is achieved that, besides obtaining watertightness, the relative elasticity of the two parts is not reduced, but even increased.

Hence, the invention relates to a push-pull connector comprising a plug provided with a spring socket and with a release socket, characterized in that it has a watertight cylindrical elastic joint, placed between the spring socket and the release socket, the elastic joint consisting of a bellows, delimited by two ribs, the spring socket and the release socket having each a circular groove for accommodating one of these ribs, the elastic joint being in a stressed condition when the release socket is forced back against the spring socket and in a rest condition when the release socket is uncoupled from the spring socket.

The invention also relates to a push-pull connector assembly comprising such a connector and an outlet, the outlet being designed to accommodate the plug, characterized in that the outlet has a plate with a circular groove and a toric joint in this groove.

BRIEF DESCRIPTION OF THE DRAWINGS

The invention will be understood more clearly by reading the following description and by analyzing the accompanying figures. The latter are only shown by way of example and do not intend to limit the invention in any manner. The figures show.

DESCRIPTION OF THE PREFERRED EMBODIMENTS

Figure 1:
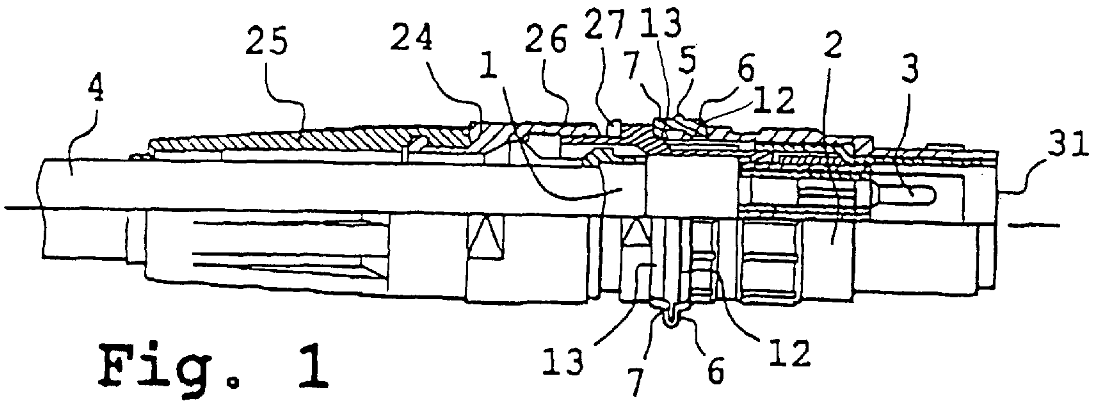
FIG. 1: a partly external and partly sectional view of a cylindrical elastic joint of the invention in two positions.

FIG. 1 shows a part of a push-pull connector assembly according to the invention. This part relates to a connector having the form of a plug. An outlet is also apparent in FIGS. 4*a* and 4*b*. Here the connector plug is of the straight type and has a spring socket 1 and a release socket 2. The release socket bears, through an insert, a set of contacts like the ones denoted with numeral 3, connected inside the plug to the conductors of a cable 4, opening out of the spring socket 1. The connection obtained by the plug may be an optical or electric connection, or else. The plug is a so-called push-pull plug since its connection to an outlet (FIG. 4*a*, FIG. 4*b*), is obtained by simply seizing the spring socket or the release socket 2 and engaging the release socket in the outlet (see FIG. 4*a* and FIG. 4*b*). The release socket is thereby pushed into the outlet. The release socket has a mechanism for driving the insert included therein, as well as a mechanism for locking the socket 2 onto the outlet. The locking effect is such that no disconnection is normally possible by simply pulling the spring socket 1 or the cable 4. The disconnection is obtained by pulling the release socket 2 to drive this release socket 2 closer to the spring socket 1. By moving closer the release socket 2, the lock of the plug on the outlet is disengaged and allows the assembly to be detached. In order to prevent the release socket from being naturally displaced due to vibrations, the spring socket 1 has springs which tend to force the release socket back towards the outlet, hence to keep a distance from the release socket. Various mechanisms of this type are known.

According to a basic characteristic of the invention, the connection, here occurring externally, between the release socket 2 and the spring socket 1 is provided with a cylindrical elastic joint 5. In the bottom part of FIG. 1, the joint 5 is in a stressed condition, because the release socket 2 is forced back against the spring socket 1. Conversely, in the top part of FIG. 1, the joint 5 is in a rest condition, because the release socket 2 is detached from the spring socket 1. The bottom of FIG. 1 shows the action required to uncouple the plug, the top of the figure shows the position of the plug when it is in the rest condition or connected to the outlet.

As shown in FIG. 1, the joint 5 has the form of a bellows. In the stressed position, two walls 6 and 7 of the bellows are folded over each other. In the rest position, the walls 6 and 7 form mutual extensions and help to give the joint 5 a cylindrical shape.

Figure 2:
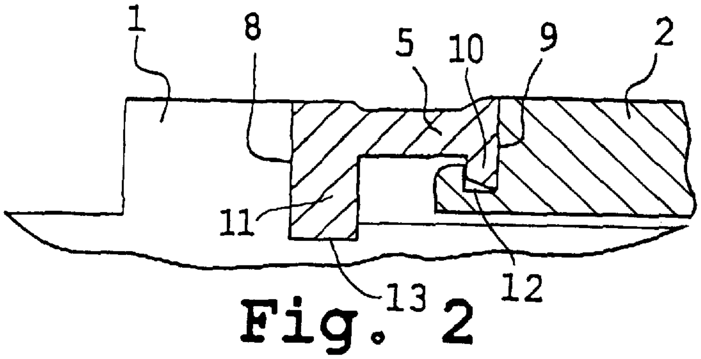
FIG. 2: a variant of the embodiment, in which the elasticity of the joint is not exerted by flexion, but y compression.

FIG. 2 shows a variant of the joint 5. The latter has, in this case, a cylindrical shape abutting against an edge 8 of the spring socket 1 and against an edge 9 of the release socket 2 respectively. In the case of the variant, the thickness of the joint 5 is such that it can only accept a few folds. It rather tends to be compressed on itself when the edge 9 gets closer to the edge B.

In the case of FIG. 1, as well as in that of FIG. 2, the joint 5 helps to drive the release socket 2 away from the spring socket 1. This action is favorable to a vibration resistant attachment of the plug inside the outlet. In fact, the spring of the spring socket 1 and the joint 5 both contrast the rise of the release socket 2 caused by vibrations. Therefore, the plug cannot be too easily released from the outlet. In this case, the joint 5 ensures a shock-absorbing function during the dynamic interactions between the two parts. Performances are hence improved in vibratory or impact conditions.

Figure 3:
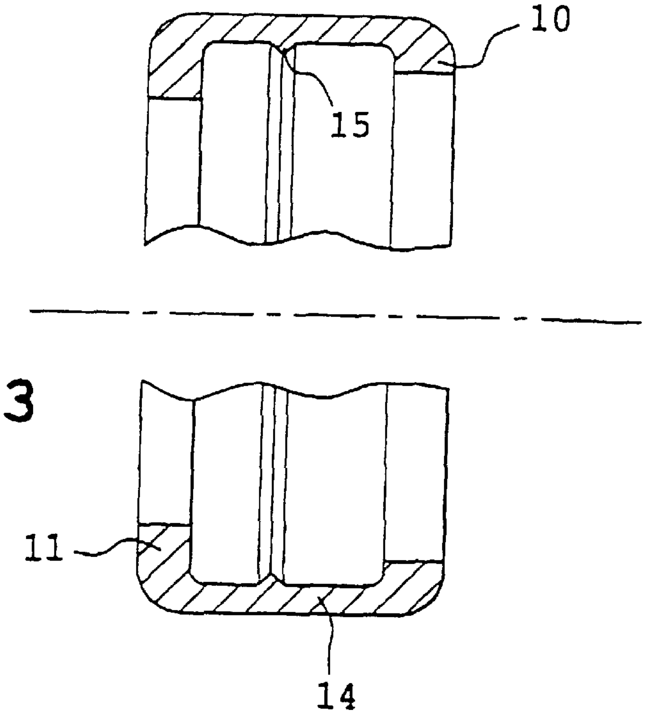
FIG. 3: a sectional view of the joint as shown in FIG. 1

FIG. 3 shows in further detail a sectional view of the bellows expansion joint as shown in FIG. 1. This has two ribs 10 and 11 in the form of rings, designed for being fitted inside circular grooves 12 and 13 respectively (FIG. 1) of the release socket 2 and of the spring socket 1. The two ribs 10 and 11 are integrated and joined to each other through a cylindrical membrane 14 thin enough to allow folding. In one example, the joint 5 is made of silicone. FIG. 3 further shows a preferred embodiment of the joint 5. Preferably, this joint is made by injection, from the inside, and has thicker parts 15 at the injection zone. These thicker parts 15 help to form a mutual folding line for the walls 6 and 7.

The joint according to the variant of FIG. 2 is pressed against the spring socket 1 and abuts against the edge 9 of the release socket 2. The compression of the joint 5 against the spring socket 1 can be effected in a groove, not shown or against the edge 8 of the latter. This compression is obtained elastically, the diameter of the joint being slightly smaller than the diameter of the groove. In any case, the ribs or edges of the joints can be glued on the sockets. The joint 5 of FIG. 2 has such a compression elasticity and such a width that it can be folded very little when the two sockets get closer, and rather has a compression reaction.

Figure 4A:
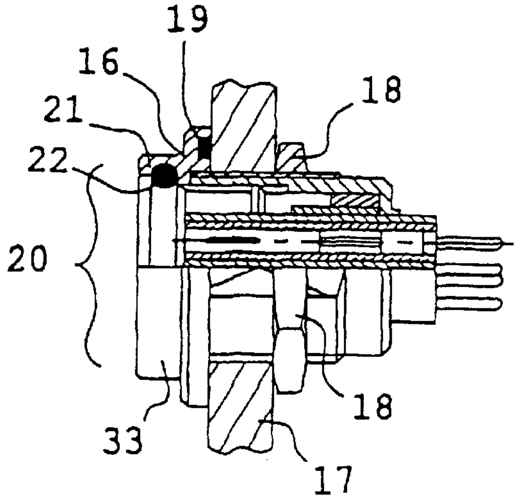
FIGS. 4*a* and 4*b*: watertight joints of the outlet which complete the watertightness of the assembly.
Figure 4B:
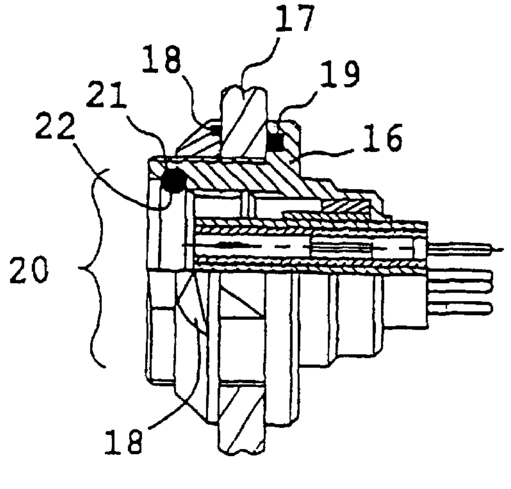

FIGS. 4*a* and 4*b* show two embodiments of the outlet for accommodating the plug of FIG. 1 or 2. These outlets have plates 16 which are meant to rest against a partition 17. In FIG. 4*a*, a front nut 33 bears the plate 16. In FIG. 4*b*, the outlet body bears the plate 16. A nut 18 disposed on the other side of the partition 17 with respect to the plate 16 allows to keep the outlet on this partition. In the case of FIG. 4*a*, the nut 18 is actually a counternut with respect to the front nut 33. The plates 16 have, at the periphery of the outlet, a groove 19' provided with a watertight joint. In natural conditions, the joint is slightly thicker than the volume of the groove. When the nut is pressed against the partition 17, the latter abuts against the plate 16 and compresses the joint 19.

Moreover, in a receptacle part 20 of the outlet which accommodates the end of the plug, the bore of the plate 16 is provided with a circular groove 21 wherein a sliding joint 22 is housed for tightly accommodating the plug, particularly the release socket.

In FIGS. 4*a* and 4*b*, the outlet has its receptacle on the left. In FIG. 4*a*, the outlet is engaged in a hole of the partition 17 both on the left and on the right. In FIG. 4*b*, it is engaged in this hole of the partition 17 on the right. The two outlets comprise female inserts to accommodate pins like those denoted with 3 on one side and contacts 23 correspondingly mounted on the other side. The internal equipment of the outlet and of the plug consists of inserts which are complementary both mechanically and functionally. The joints of the outlet provide watertightness during coupling between the plug and the outlet and between the outlet and the partition. The solution as shown in FIG. 4*a* has the further advantage that it can be used directly on standard outlet boxes or bodies and for extension cords. The existing front nut must be simply replaced by a nut 33 having the plate 16 with its joints. It will be noted that a smart arrangement has been provided for this, in that the nut 33 with the plate 16 bears the two joints 19 and 22. The cut formed in the partition for the introduction of the outlet particularly remains the same. So, previously non watertight equipment can be easily adapted.

FIG. 1 also shows the presence of a locking socket 24 which has the function to ensure a mechanical lock of the body of the cable 4 in the spring socket 1. Generally, the locking socket 24, here including a watertight skirt 25 is screwed onto the threads 26 of the spring socket 1. In order to ensure watertightness, as well as a mechanical locking effect, the expedient is known of applying glue to these threads 26, said glue having a braking and a sealing function. In this case, watertightness is obtained through an operation which is irreversible on the one hand, and difficult to perform with glue on the other. This operation is irreversible because watertightness has to be restored after each disconnection. In this case, according to the invention, the provision of this thread-braking glue can be replaced or completed by an elastic compressed tube 27 of the stuffing-box type. So, by pressing the socket 24 against the socket 1, the elastic tube 27 is compressed between the front edges of these two sockets and produces the required watertightness. If needed, the locking socket and the spring socket have a front flange for abutment against the joint 27.

Figure 5A:
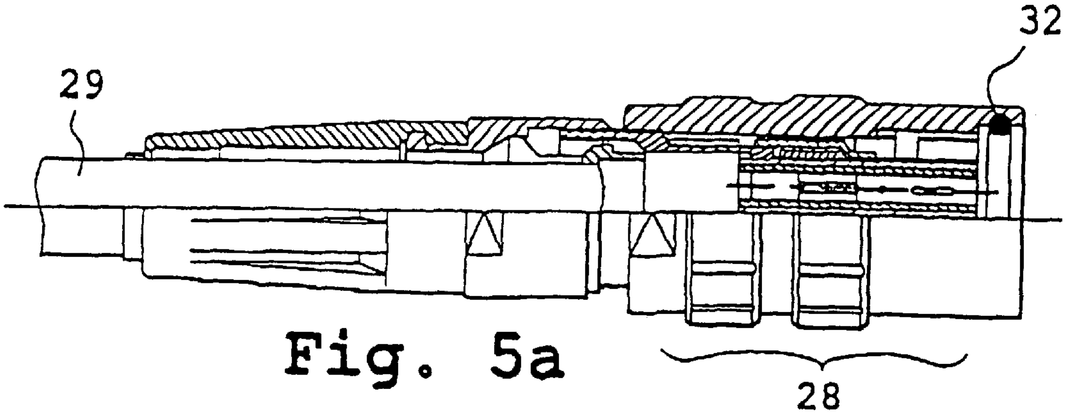
FIGS. 5*a* and 5*b*: extension cords having watertight features, when associated to the connector assembly of the invention.
Figure 5B:
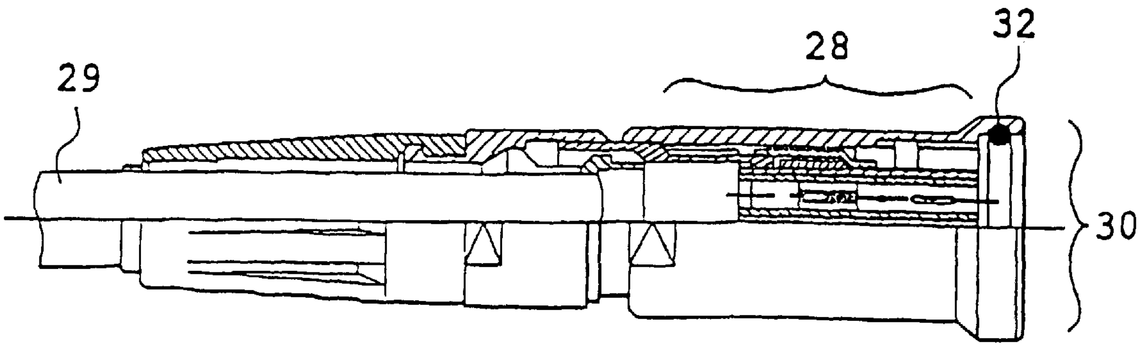

FIGS. 5*a* and 5*b* also show the construction of extension cords 28 to be connected in lieu of a plug at the end of a cable 9 and comprising receptacles 30 designed for accommodating the end 31 of a plug. Then the extension cords have the function of an outlet. They are also provided with sliding joints 32 of the same type as the joints 22 of the outlets. The extension cords also have a complementary well-known locking mechanism to cooperate with a plug like the one shown in FIG. 1. The joints 32, as well as the joints 22 or 19 do not alter the push-pull feature of the assembly, because they do not affect the elastic movement of the release socket 2 away from the spring socket 1.

What is claimed is:

1. A push-pull connector comprising a plug including a spring socket and a release socket, wherein the connector includes a watertight cylindrical elastic joint having edge portions in permanent contact with each of the sockets, the joint being positioned between the spring socket and the release socket, the elastic joint consisting of a bellows defined by two ribs, the spring socket and the release socket having each a circular groove, the ribs respectively fitted inside the circular grooves, the elastic joint being in a stressed condition when the release socket is forced back against the spring socket and in a non-stressed condition when the release socket is uncoupled from the spring socket.

2. A push-pull connector assembly comprising a connector as claimed in claim 1 and further including an outlet, the outlet being adapted to accommodate the plug, wherein the outlet includes a plate with a circular groove and a joint positioned in the circular groove of the plate.

3. The assembly as claimed in claim 2, wherein said outlet has a sliding joint adapted to accommodate an end of said plug.

4. The assembly as claimed in claim 3, wherein said sliding joint is positioned in contact with said release socket.

5. The connector as claimed in claim 1, wherein said plug has a locking socket for locking a cable and an elastic compressed tube, compressed between a nut and a flange of the spring socket.

* * * * *